United States Patent
Moskovich

(10) Patent No.: US 6,563,650 B2
(45) Date of Patent: May 13, 2003

(54) COMPACT, TELECENTRIC PROJECTION LENSES FOR USE WITH PIXELIZED PANELS

(75) Inventor: Jacob Moskovich, Cincinnati, OH (US)

(73) Assignee: 3M Innovative Properties Company, St. Paul, MN (US)

(*) Notice: Subject to any disclaimer, the term of this patent is extended or adjusted under 35 U.S.C. 154(b) by 51 days.

(21) Appl. No.: 09/764,820

(22) Filed: Jan. 17, 2001

(65) Prior Publication Data
US 2002/0141072 A1 Oct. 3, 2002

(51) Int. Cl.⁷ .............................. G02B 13/22; G02B 3/00
(52) U.S. Cl. ........................ 359/663; 359/648; 359/649; 359/745; 359/750
(58) Field of Search ................................ 359/663, 649, 359/648, 745, 750, 751–753

(56) References Cited

U.S. PATENT DOCUMENTS

| | | |
|---|---|---|
| 5,218,480 A | 6/1993 | Moskovich |
| 5,625,495 A | 4/1997 | Moskovich |
| 5,822,128 A * | 10/1998 | Sekine .................. 359/650 |
| 5,870,228 A | 2/1999 | Kreitzer et al. |
| 5,914,818 A | 6/1999 | Tejada et al. |
| 6,195,209 B1 * | 2/2001 | Kreitzer et al. .......... 359/649 |

FOREIGN PATENT DOCUMENTS

WO    WO 00/67059    11/2000

* cited by examiner

*Primary Examiner*—Loha Ben
*Assistant Examiner*—M. Hasan
(74) *Attorney, Agent, or Firm*—Bruce E. Black; Maurice M. Klee

(57) ABSTRACT

Telecentric projection lenses for use with pixelized panels (PP) are provided. The projection lenses have a negative first unit (U1) which has at least one negative meniscus element (N1) having at least one aspheric surface and a positive second unit (U2) which has at least one positive element (P1) having at least one aspheric surface. The lens' aperture stop (AS) is located between the two units, and a third lens unit (U3) may be used in the vicinity of the aperture stop to improve the correction of axial color. The lenses have small forward vertex distances, small clear apertures, and long back focal lengths which make them particularly well-suited for use in the manufacture of compact projection systems.

11 Claims, 5 Drawing Sheets

COMPACT, TELECENTRIC PROJECTION LENSES FOR USE WITH PIXELIZED PANELS

FIELD OF THE INVENTION

This invention relates to projection lenses and, in particular, to compact, telecentric projection lenses having large effective back focal length to focal length ratios for use in forming an image of an object composed of pixels, such as, an LCD, a reflective LCD, a DMD, or the like.

DEFINITIONS

As used in this specification and in the claims, the following terms shall have the following meanings:

(1) Telecentric

Telecentric lenses are lenses which have at least one pupil at infinity. In terms of principal rays, having a pupil at infinity means that the principal rays are parallel to the optical axis (a) in object space, if the entrance pupil is at infinity, or (b) in image space, if the exit pupil is at infinity. Since light can propagate through a lens in either direction, the pupil at infinity can serve as either an entrance or an exit pupil depending upon the lens' orientation with respect to the object and the image. Accordingly, the term "telecentric pupil" will be used herein to describe the lens' pupil at infinity, whether that pupil is functioning as an entrance or an exit pupil.

In practical applications, the telecentric pupil need not actually be at infinity since a lens having an entrance or exit pupil at a sufficiently large distance from the lens' optical surfaces will in essence operate as a telecentric system. The principal rays for such a lens will be substantially parallel to the optical axis and thus the lens will in general be functionally equivalent to a lens for which the theoretical (Gaussian) location of the pupil is at infinity.

Accordingly, as used herein, the terms "telecentric" and "telecentric lens" are intended to include lenses which have at least one pupil at a long distance from the lens' elements, and the term "telecentric pupil" is used to describe such a pupil at a long distance from the lens' elements. For the projection lenses of the invention, the telecentric pupil distance will in general be at least about 10 times the lens' focal length.

(2) Effective Back Focal Length

The effective back focal length (BFL) of a projection lens/pixelized panel combination is the distance between the front surface of the pixelized panel and the vertex of the back surface of the rearward-most lens element of the projection lens which has optical power when (1) the image of the pixelized panel is located at infinity and (2) the projection lens is located in air, i.e., the space between the rearward-most lens element of the projection lens and the pixelized panel is filled with air as opposed to the glasses making up the prisms, beam splitters, etc. normally used between a projection lens and a pixelized panel.

(3) Forward Vertex Distance

The forward vertex distance (FVD) of a projection lens/ pixelized panel combination is the distance between the front surface of the pixelized panel and the vertex of the front surface of the forward-most lens element of the projection lens which has optical power when (1) the image of the pixelized panel is located at infinity and (2) the projection lens is located in air, i.e., the space between the rearward-most lens element of the projection lens and the pixelized panel is filled with air as opposed to the glasses making up the prisms, beam splitters, etc. normally used between a projection lens and a pixelized panel.

BACKGROUND OF THE INVENTION

Projection lens systems (also referred to herein as "projection systems") are used to form an image of an object on a viewing screen. Such systems can be of the front projection or rear projection type, depending on whether the viewer and the object are on the same side of the screen (front projection) or on opposite sides of the screen (rear projection).

The basic structure of such a system is shown in FIG. 5, where 10 is a light source (e.g., a metal halide or a high pressure mercury vapor lamp), 12 is illumination optics which forms an image of the light source (the "output" of the illumination system), 14 is the object which is to be projected (e.g., an LCD matrix of on and off pixels), and 13 is a projection lens, composed of multiple lens elements, which forms an enlarged image of object 14 on viewing screen 16.

For front projection systems, the viewer will be on the left side of screen 16 in FIG. 5, while for rear projection systems, the viewer will be on the right side of the screen. For rear projection systems which are to be housed in a single cabinet, a mirror is often used to fold the optical path and thus reduce the system's overall size.

Projection lens systems in which the object is a pixelized panel are used in a variety of applications. Such systems preferably employ a single projection lens which forms an image of either a single panel having red, green, and blue pixels or of three panels, one for red light, a second for green light, and a third for blue light. In some cases, e.g., large image rear projection systems, multiple panels and multiple projection lenses are used, with each panel/projection lens combination producing a portion of the overall image. In either case, projection lenses used with such systems generally need to have a long effective back focal length to accommodate the prisms, beam splitters, color wheels, etc. normally used with pixelized panels.

A particularly important application of projection lens systems employing pixelized panels is in the area of microdisplays, e.g., front projection systems which are used to display data and rear projection systems which are used as computer monitors. Recent breakthroughs in manufacturing technology has led to a rise in popularity of microdisplays employing digital light valve devices such as DMDs, reflective LCDs, and the like.

Projection displays based on these devices offer advantages of small size and light weight. As a result, a whole new class of ultra portable lightweight projectors operating in front-projection mode and employing digital light valves has appeared on the market. Lightweight compact rear projection systems can also be achieved through the use of these devices.

To display images having a high information content, these devices must have a large number of pixels. Since the devices themselves are small, the individual pixels are small, a typical pixel size ranging from $17\mu$ for DMD displays to approximately $8\mu$ or even less for reflective LCDs. This means that the projection lenses used in these systems must have a very high level of correction of aberrations. Of particular importance is the correction of chromatic aberrations and distortion.

A high level of chromatic aberration correction is important because color aberrations can be easily seen in the image of a pixelized panel as a smudging of a pixel or, in extreme cases, the complete dropping of a pixel from the image. These problems are typically most severe at the edges of the field.

All of the aberrations of the system need to be addressed, with lateral color, chromatic variation of coma, astigmatism, and distortion typically being most challenging. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing cathode ray tubes (CRTs) a small amount of (residual) lateral color can be compensated for electronically by, for example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction, including correction of secondary lateral color, is thus needed from the projection lens.

The use of a pixelized panel to display data leads to stringent requirements regarding the correction of distortion. This is so because good image quality is required even at the extreme points of the field of view of the lens when viewing data. As will be evident, an undistorted image of a displayed number or letter is just as important at the edge of the field as it is at the center. Moreover, projection lenses are often used with offset panels. In such a case, the distortion at the viewing screen does not vary symmetrically about a horizontal line through the center of the screen but can increase monotonically from, for example, the bottom to the top of the screen. This effect makes even a small amount of distortion readily visible to the viewer.

Low distortion and a high level of color correction are particularly important when an enlarged image of a WINDOWS type computer interface is projected onto a viewing screen. Such interfaces with their parallel lines, bordered command and dialog boxes, and complex coloration, are in essence test patterns for distortion and color. Users readily perceive and object to even minor levels of distortion or color aberration in the images of such interfaces.

The above-mentioned microdisplays typically require that the light beam from the illumination system has a near-normal angle of incidence upon the display. In terms of the projection lens, this translates into a requirement that the lens has a telecentric entrance pupil, i.e., the projection lens must be telecentric in the direction of its short imaging conjugate where the object (pixelized panel) is located. This makes the lens asymmetric about the stop which makes the correction of lateral color more difficult.

In addition to the foregoing, for rear projection systems, there is an ever increasing demand for smaller cabinet sizes (smaller footprints). In terms of the projection lens, this translates into a requirement that the lens has a wide field of view in the direction of the image (screen). This requirement makes it even more difficult to correct the lateral color of the lens. Similarly, the requirement for a long effective back focal length also makes it more difficult to correct lateral color.

In addition to having a wide field of view, the demand for smaller cabinet sizes also translates into a requirement that the lens has a short forward vertex distance. In this way, the amount of linear space that must be allocated to the projection lens in the cabinet is reduced. Also, for a given field of view, a shorter forward vertex distance results in a smaller maximum clear aperture for the lens elements used in the projection lens. This not only reduces the maximum transverse dimension of the lens, but also reduces its weight and cost. As with effective back focal length, reducing the forward vertex distance makes it more difficult to correct the aberrations of the lens. In particular, a shorter forward vertex distance generally requires stronger lens elements whose aberrations are more difficult to correct.

Achieving a short focal length, a long effective back focal length, a wide field of view in the direction of the lens' long conjugate, and a short forward vertex distance simultaneously, while still maintaining the high level of aberration correction needed for a projection lens system which employs pixelized panels is particularly challenging since these various requirements tend to work against one another. As discussed and illustrated below, the present invention provides projection lenses which satisfy these conflicting criteria.

SUMMARY OF THE INVENTION

In view of the foregoing, there exists a need in the art for projection lenses for use with pixelized panels which have some and preferably all of the following properties:

(1) a high level of lateral color correction, including correction of secondary lateral color;

(2) low distortion;

(3) a large field of view in the direction of the image;

(4) a telecentric entrance pupil;

(5) a long effective back focal length;

(6) a short forward vertex distance; and (7) a small maximum clear aperture for the lenses making up the projection lens.

To satisfy this need in the art, the invention provides projection lenses which have some and preferably all of the above seven features.

In particular, the invention provides a projection lens for forming an image of a pixelized panel, wherein the projection lens has a long conjugate side (image or screen side) and a short conjugate side (object or pixelized panel side) and comprises in order from its long conjugate to its short conjugate of:

(A) a first lens unit (U1) having a negative power and comprising at least one negative lens element (N1) of overall meniscus shape, said negative lens element being convex towards the long conjugate side and comprising at least one aspheric surface; and (B) a second lens unit (U2) having a positive power, said second lens unit being separated from the first lens unit by an axial space and comprising at least one positive lens element (P1) which comprises at least one aspheric surface;

wherein:

(i) the projection lens is telecentric on the short conjugate side; and (ii) the projection lens has an effective focal length $f_0$, an effective back focal length BFL, and a forward vertex distance FVD which satisfy the following relationships:

$BFL/f_0 > 3.5$; and $FVD/f_0 < 20$.

Preferably, the $BFL/f_0$ ratio is greater than 4.0 and in some cases can be greater than 4.5 and even greater than 5.0. Similarly, the $FVD/f_o$ ratio is preferably less than 17 and in some cases can be less than 15 and even less than 13.

In addition to having the above $BFL/f_o$ and $FVD/f_0$ ratios, the projection lenses of the invention preferably have a field of view θ in the direction of the long conjugate of at least 70° (e.g., 75°≦θ≦80°) and a maximum clear aperture to $f_0$ ratio ($D/f_0$ ratio) which is less than 5.0 and in some cases is less than 4.0.

The foregoing drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

The projection lenses of the present invention are of the retrofocus or the inverted telephoto type and consist of two lens units, i.e., a negative unit (U1) on the long conjugate side and a positive unit (U2) on the short conjugate side, which are typically separated by an aperture stop.

The use of this overall lens form to produce an image of a pixelized panel has various advantages. Thus, telecentricity can be achieved by locating the lens' aperture stop in the front focal plane of the second positive unit. Additional advantages, illustrated by the examples presented below, are the ability to achieve a long effective back focal length and the ability to provide a wide field of view in the direction of the lens' long conjugate. Both of these characteristics are particularly useful in rear projection systems, where the lens must have a wide field of view to achieve the smallest possible overall package size, and where there is a need to accommodate beam splitting prisms between the lens and the pixelized panel. These prisms may include polarizing beam splitters, as well as color splitting prisms.

The lenses of the invention achieve a high level of distortion correction by using one or more aspherical surfaces in the first lens unit. Some residual distortion, as well as spherical aberration of the lens' entrance pupil, is corrected through the use of one or more aspherical surfaces in the second lens unit. The spherical aberration of the entrance pupil should be minimized to achieve telecentricity for any arbitrary point in the object plane of the lens. Preferably, the aspherical surfaces are formed on plastic lens elements.

The most critical aberration that must be corrected is the lens' lateral color. The lenses of the invention preferably achieve such correction using the techniques of commonly-assigned U.S. patent application Ser. No. 09/304,693, filed May 4, 1999, and entitled "Projection Lenses Having Reduced Lateral Color for Use with Pixelized Panels," the contents of which are incorporated herein by reference. This application was published on Nov. 9, 2000, as PCT Patent Publication No. WO 00/67059. Although preferred, the approaches of the foregoing application need not be used in the practice of the present invention.

Figure 1:
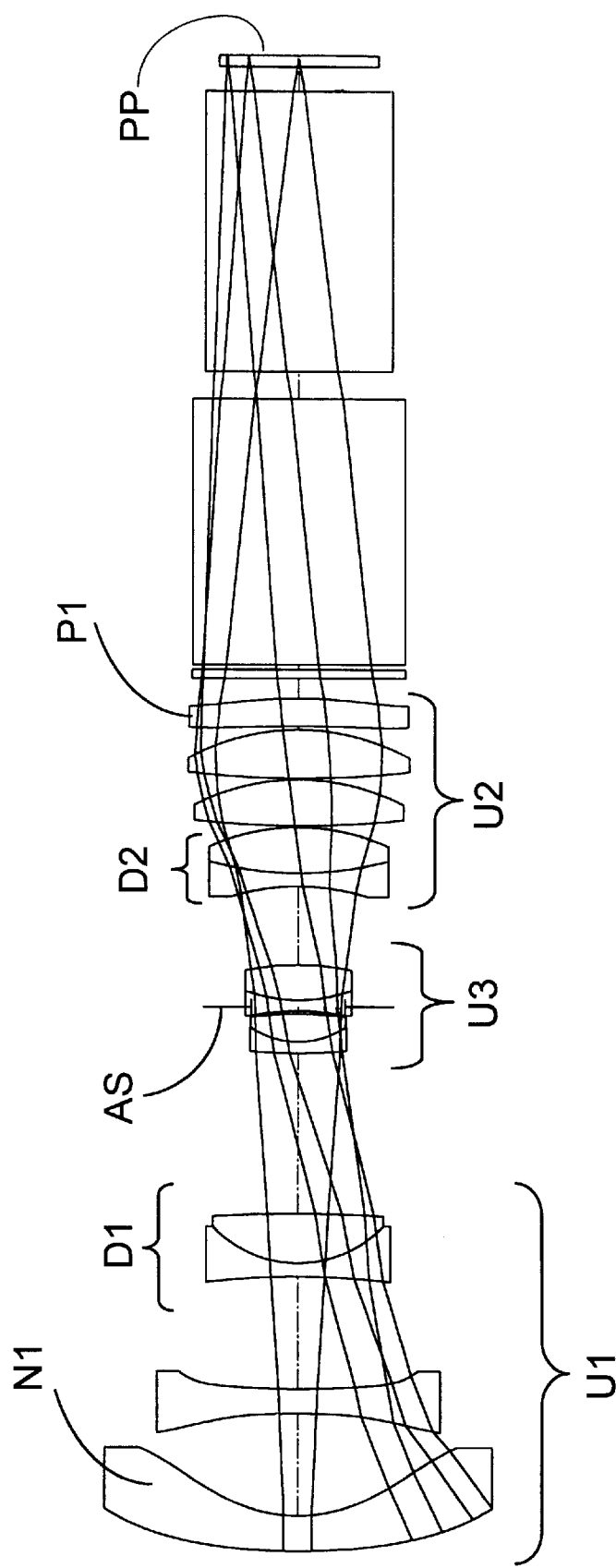
FIGS. 1–4 are schematic side views of representative projection lenses constructed in accordance with the invention.
Figure 2:
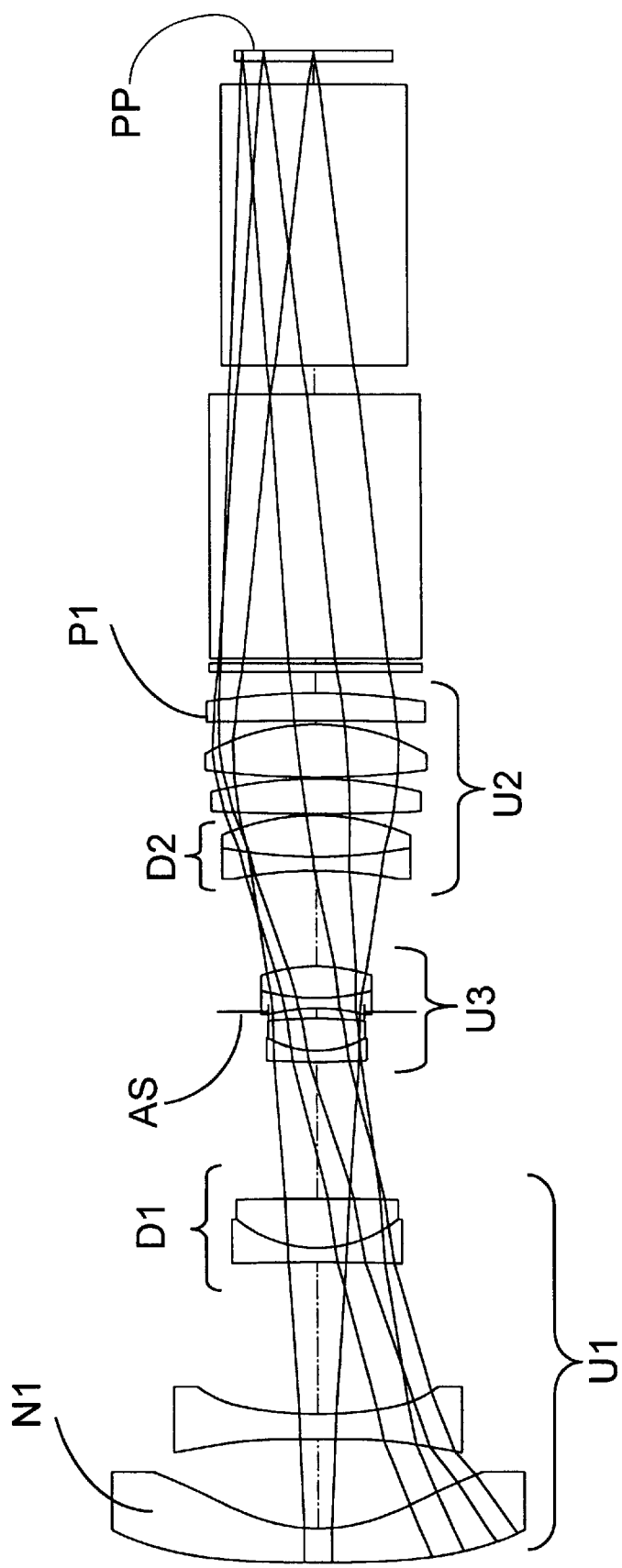
Figure 3:
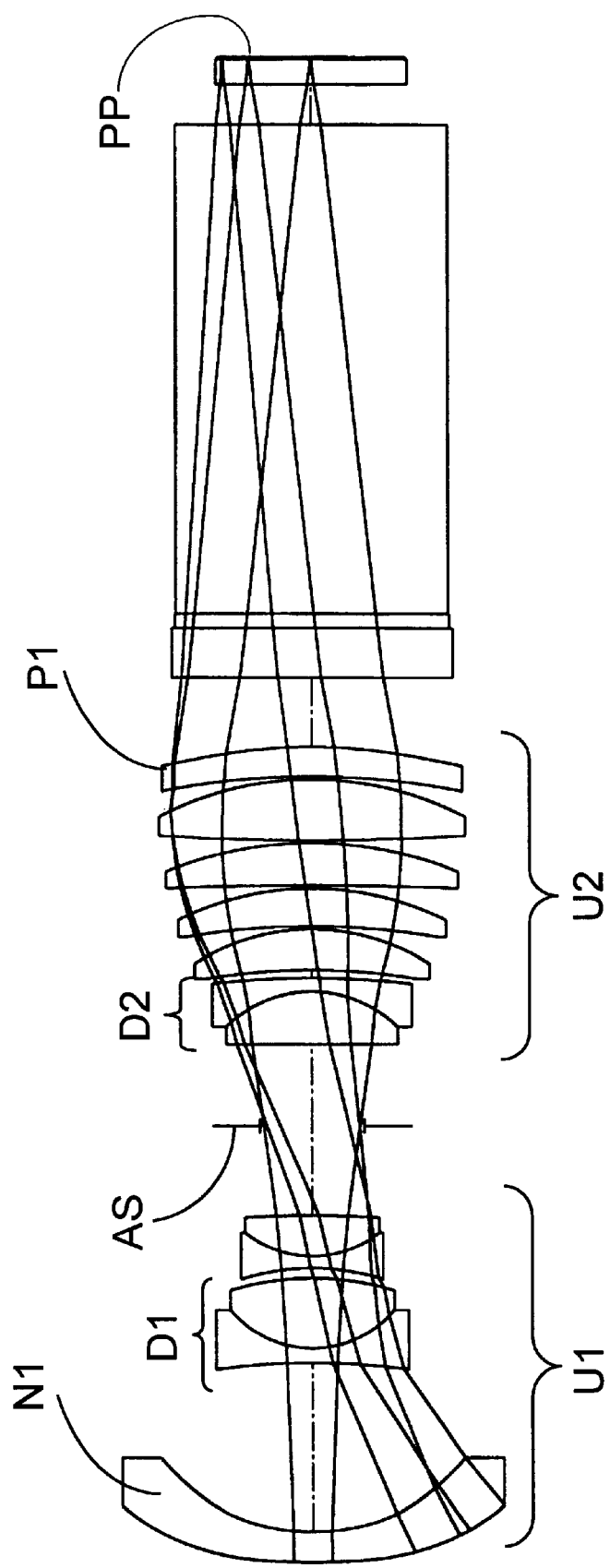
Figure 4:
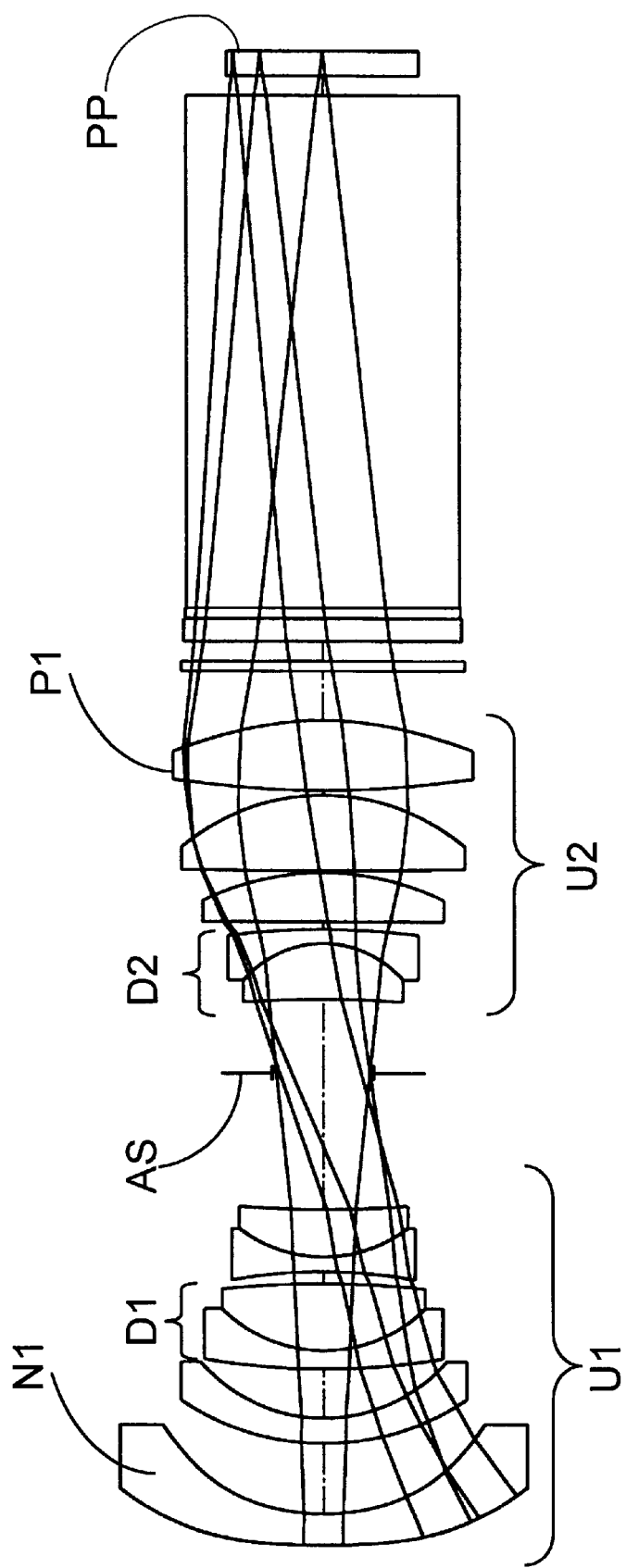
Figure 5:
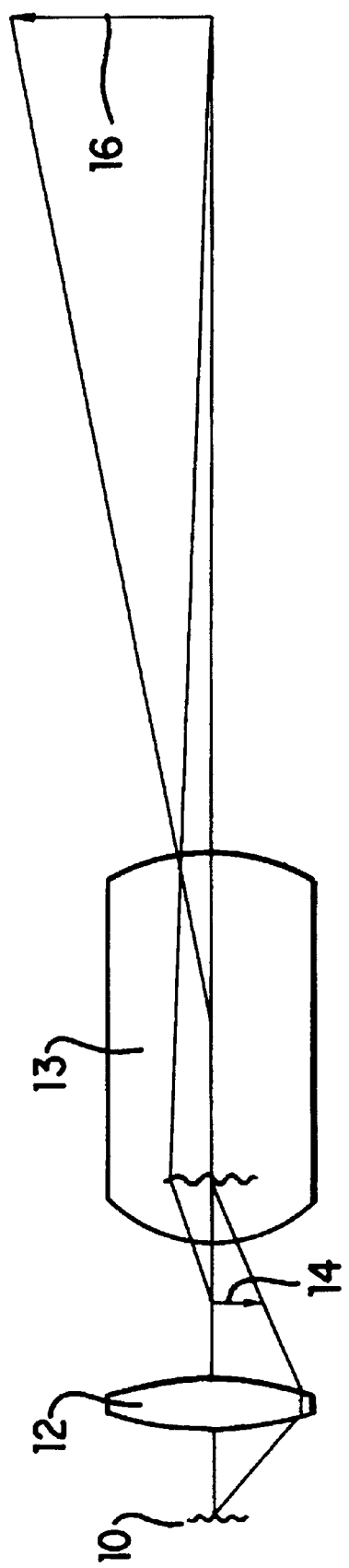
FIG. 5 is a schematic diagram showing an overall projection lens system in which the projection lenses of the present invention can be used.

Whatever approach is used to correct lateral color, each of the first and second lens units will preferably comprise at least one color correcting doublet (D1 and D2, respectively, in FIGS. 1–4). Also, the projection lens can include a third lens unit (U3) located in the vicinity of the aperture stop which preferably includes at least one color correcting doublet and serves to improve the axial color correction of the lens.

Without intending to limit it in any manner, the present invention will be more fully described by the following examples.

EXAMPLES

FIGS. 1–4 and Tables 1–4 illustrate representative projection lenses constructed in accordance with the invention.

HOYA designations are used for the various glasses employed in the lens systems. Equivalent glasses made by other manufacturers (e.g., OHARA or SCHOTT) can be used in the practice of the invention. Industry acceptable materials are used for the plastic elements.

The aspheric coefficients set forth in the tables are for use in the following equation:

$$z = \frac{cy^2}{1+[1-(1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1–4.

The designation "a" associated with various surfaces in the tables represents an aspherical surface, i.e., a surface for which at least one of D, E, F, G, H, or I in the above equation is not zero; and the designation "c" indicates a surface for which k in the above equation is not zero. The various planar structures located on the short conjugate side of U2 in the figures and tables represent components which are used with or are a part of the pixelized panel. They do not constitute part of the projection lens. All dimensions given in the tables are in millimeters.

The prescription tables are constructed on the assumption that light travels from left to right in the figures. In actual practice, the viewing screen will be on the left and the pixelized panel will be on the right, and light will travel from right to left. In particular, the references in the prescription tables to objects/images and entrance/exit pupils are reversed from that used in the rest of the specification. The pixelized panel is shown in the FIGS. 1–4 by the designation "PP" and the aperture stop is shown by the designation "AS".

The focal lengths of the various lens units making up the projection lenses of Tables 1–4 are set forth in Table 5 where f1 is the focal length of U1, f2 is the focal length of U2, and f3 is the focal length of U3. Two entries are provided for the lens of FIG. 1 corresponding to the two focus positions shown for that lens in Table 1. In practice, the lenses of FIGS. 2–4 may also include variable spaces of the type shown in Table 1 for use in focusing the lens for different conjugates.

Table 6 lists $BFL/f_0$, $FVD/f_0$, $D/f_0$, and θ values for the lenses of Tables 1–4. As can be seen in this table, the lenses of the examples have $BFL/f_0$ ratios greater than 3.5, $FVD/f_0$ ratios less than 20, $D/f_0$ ratios less than 5.0 and θ values greater than 70° which makes the lenses particularly well-suited to the manufacture of compact projection lens systems which employ pixelized panels.

In addition to the properties shown in Table 6, the projection lenses of the invention preferably also have the following properties:

(i) a lateral color blur at full field for wavelengths in the range from 460 nanometers to 620 nanometers which is less than a pixel and preferably less than three-quarters of a pixel (note that the level of lateral color correction can be determined at the object plane or the image plane, a magnified pixel being used when the determination is performed at the image plane); and (ii) a distortion which is less than 1.5 percent and preferably less than or equal to 1.0 percent.

The projection lenses of Tables 1–4 achieve both of the foregoing preferred lateral color and preferred distortion levels. In particular, the lenses achieve the preferred level of lateral color correction for a pixel size (pixel width) of less than 15 microns.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 | a | 117.6365 | 5.00000 | ACRYLIC | 54.99 |
| 2 | ac | 21.4274 | Space 1 | | 43.00 |
| 3 | a | −127.4598 | 3.50000 | ACRYLIC | 38.12 |
| 4 | a | 124.5786 | 15.82974 | | 31.99 |
| 5 | | −111.5955 | 2.00000 | S-PHM52 | 24.05 |
| 6 | | 16.6022 | 7.00000 | PBM3 | 22.20 |
| 7 | | −206.1765 | 22.68808 | | 21.55 |
| 8 | | 83.4212 | 1.60000 | S-LAH59 | 12.65 |
| 9 | | 11.8097 | 4.00000 | S-TIH14 | 12.52 |
| 10 | | −56.3462 | 1.00000 | | 12.51 |
| 11 | | Aperture stop | −0.57048 | | 12.33 |
| 12 | | −34.9748 | 1.50000 | S-LAH60 | 12.47 |
| 13 | | 21.6254 | 5.00000 | S-FSL5 | 12.83 |
| 14 | | −36.2924 | 11.16324 | | 14.09 |
| 15 | | −32.4760 | 2.00000 | S-LAH60 | 18.53 |
| 16 | | 47.0151 | 6.50000 | S-FPL53 | 20.88 |
| 17 | | −30.9043 | 0.20000 | | 23.46 |
| 18 | | 135.5060 | 6.50000 | S-FPL53 | 26.20 |
| 19 | | −32.3081 | 0.20000 | | 27.60 |
| 20 | | 135.5060 | 7.00000 | S-FPL53 | 28.92 |
| 21 | | −32.3081 | 0.50000 | | 29.36 |
| 22 | a | −200.0000 | 4.00000 | ACRYLIC | 29.05 |
| 23 | a | −70.0000 | Space 2 | | 28.80 |
| 24 | | ∞ | 1.20000 | BK7 | 28.23 |
| 25 | | ∞ | 0.70000 | | 28.12 |
| 26 | | ∞ | 38.00000 | SF1 | 28.03 |
| 27 | | ∞ | 4.00000 | | 25.02 |
| 28 | | ∞ | 40.00000 | BK7 | 24.48 |
| 29 | | ∞ | 3.40000 | | 20.88 |
| 30 | | ∞ | 1.60000 | BK7 | 20.48 |
| 31 | | ∞ | Image distance | | 20.36 |

Symbol Description
a - Polynomial asphere
c - Conic section

Even Polynomial Aspheres

| Surf. No. | D | E | F | G | H | I |
|---|---|---|---|---|---|---|
| 1 | 9.6519E−06 | −1.5632E−08 | 1.2711E−11 | 5.5342E−15 | −6.5286E−18 | −1.9134E−21 |
| 2 | 8.6678E−06 | −4.2959E−08 | 7.0767E−12 | 8.8543E−14 | −2.4573E−16 | 2.2616E−19 |
| 3 | −2.4746E−05 | 2.5825E−08 | 1.1482E−10 | −3.6770E−14 | −6.0705E−16 | 6.7521E−19 |
| 4 | −8.7253E−06 | 6.6534E−08 | −7.5878E−11 | 8.8981E−14 | 5.0109E−15 | −1.2287E−17 |
| 22 | 2.0719E−06 | 1.4805E−08 | 2.7648E−11 | −1.1585E−13 | 1.5856E−15 | −3.6956E−18 |
| 23 | 4.6867E−06 | 1.1179E−08 | 1.3295E−10 | −1.0815E−12 | 5.7973E−15 | −1.0147E−17 |

Conic Constant
Surface 2    k = −1.0000E+00

Variable Spaces

| Focus Pos. | Space 1 T(2) | Space 2 T(23) | Focal Shift | Image Distance |
|---|---|---|---|---|
| 1 | 14.468 | 3.000 | 0.034 | −0.011 |
| 2 | 14.109 | 2.727 | 0.014 | −0.002 |

TABLE 1-continued

First-Order Data

| | | |
|---|---|---|
| f/number | 2.80 | 2.80 |
| Magnification | −0.0348 | −0.0133 |
| Object Height | −292.10 | −762.00 |
| Object Distance | −322.02 | −891.43 |
| Effective Focal Length | 12.235 | 12.278 |
| Image Distance | −.11098E−01 | −.17710E−02 |
| Overall Length | 534.99 | 1103.8 |
| Barrel Length | 212.98 | 212.35 |
| Stop Surface Number | 11 | 11 |
| Stop Diameter | 12.035 | 12.029 |
| Entrance Pupil Distance | 29.763 | 29.664 |
| Exit Pupil Distance | −729.89 | −729.62 |

TABLE 2

| Surf. No. | Type | Radius | Thickness | Glass | Clear Aperture Diameter |
|---|---|---|---|---|---|
| 1 | a | 313.2208 | 5.00000 | ACRYLIC | 56.58 |
| 2 | ac | 24.5396 | 12.60286 | | 44.81 |
| 3 | a | −2021.5999 | 3.50000 | ACRYLIC | 38.88 |
| 4 | a | 55.8585 | 21.60922 | | 32.29 |
| 5 | | −338.5775 | 2.00000 | S-LAL18 | 22.15 |
| 6 | | 17.8685 | 7.00000 | S-TIM35 | 20.99 |
| 7 | | −426.6654 | 19.43304 | | 20.34 |
| 8 | | 138.6638 | 1.60000 | S-LAH59 | 13.25 |
| 9 | | 14.7900 | 4.50000 | S-TIH14 | 12.79 |
| 10 | | −67.8402 | 0.97982 | | 12.83 |
| 11 | | Aperture stop | 0.50000 | | 12.70 |
| 12 | | −26.6748 | 1.50000 | S-LAH60 | 12.72 |
| 13 | | 31.5122 | 4.50000 | S-FPL53 | 13.47 |
| 14 | | −24.2044 | 13.59935 | | 14.74 |
| 15 | | −60.1999 | 2.00000 | S-LAH60 | 21.30 |
| 16 | | 68.4138 | 6.00000 | S-FPL53 | 23.01 |
| 17 | | −32.7938 | 0.20000 | | 24.78 |
| 18 | | 310.3792 | 5.00000 | S-FPL53 | 26.60 |
| 19 | | −58.4342 | 0.20000 | | 27.80 |
| 20 | | 114.0878 | 7.50000 | S-FPL53 | 28.78 |
| 21 | | −32.1934 | 0.50000 | | 29.37 |
| 22 | | −1000.0000 | 4.00000 | ACRYLIC | 29.00 |
| 23 | a | −90.5000 | 3.00000 | | 28.89 |
| 24 | | ∞ | 1.20000 | BK7 | 28.21 |
| 25 | | ∞ | 0.70000 | | 28.11 |
| 26 | | ∞ | 38.00000 | SF1 | 28.01 |
| 27 | | ∞ | 4.00000 | | 24.95 |
| 28 | | ∞ | 40.00000 | BK7 | 24.40 |
| 29 | | ∞ | 3.40000 | | 20.85 |
| 30 | | ∞ | 1.60000 | BK7 | 20.46 |
| 31 | | ∞ | 0.01932 | | 20.36 |

Symbol Description
a - Polynomial asphere
c - Conic section
Focal Shift    0.02369

Even Polynomial Aspheres

| Surf. No. | D | E | F | G | H | I |
|---|---|---|---|---|---|---|
| 1 | 8.1433E−06 | −1.2583E−08 | 1.3837E−11 | 1.3471E−15 | −1.2875E−17 | 7.0217E−21 |
| 2 | −3.7080E−07 | −3.5690E−08 | 8.7206E−12 | 1.0950E−13 | −1.7448E−16 | 9.0724E−20 |
| 3 | −2.3975E−05 | 1.4822E−08 | 1.0183E−10 | −2.8001E−14 | −5.0803E−16 | 5.6897E−19 |
| 4 | −7.9144E−06 | 8.2684E−08 | −1.2117E−10 | −1.7154E−13 | 4.5131E−15 | −1.0098E−17 |
| 23 | 2.2878E−06 | −8.1965E−09 | 1.5043E−10 | −1.1882E−12 | 4.5352E−15 | −6.5914E−18 |

Conic Constant
Surface 2    k = −1.0000E+00

First Order Data

| | | | |
|---|---|---|---|
| f/number | 2.80 | Overall Length | 535.622 |
| Magnification | −0.0348 | Stop Diameter | 12.390 |
| Object Height | −292.10 | Barrel Length | 215.624 |

TABLE 2-continued

| Object Distance | −319.979 | Entrance Pupil Distance | 29.2388 |
| --- | --- | --- | --- |
| Effective Focal Length | 12.1460 | Exit Pupil Distance | −760.102 |
| Image Distance | 0.193170E−01 | | |
| Stop Surface Number | 11 | | |

TABLE 3

| Surf. No. | Type | Radius | Thickness | Glass | Clear Aperture Diameter |
| --- | --- | --- | --- | --- | --- |
| 1 | a | 96.3733 | 3.00000 | ACRYLIC | 38.06 |
| 2 | ac | 22.1246 | 16.83895 | | 30.28 |
| 3 | | −71.4185 | 1.50000 | S-LAH66 | 18.10 |
| 4 | | 10.6036 | 7.00000 | S-FTM16 | 15.29 |
| 5 | | −27.6402 | 1.00000 | | 14.22 |
| 6 | | −22.8394 | 1.20000 | S-LAH66 | 13.16 |
| 7 | | 10.4229 | 4.10000 | 5-TIH10 | 12.35 |
| 8 | | −103.2388 | 8.87383 | | 12.11 |
| 9 | | Aperture stop | 8.22815 | | 9.86 |
| 10 | | −1477.8659 | 5.30000 | S-FPL53 | 14.90 |
| 11 | | −12.1897 | 1.30000 | S-LAH55 | 16.03 |
| 12 | | −86.4322 | 0.80000 | | 18.81 |
| 13 | | −62.8290 | 4.10000 | S-FPL53 | 19.50 |
| 14 | | −21.2300 | 0.30000 | | 21.35 |
| 15 | | −73.3053 | 3.80000 | S-FPL53 | 23.22 |
| 16 | | −29.4771 | 0.30000 | | 24.58 |
| 17 | | −389.3199 | 4.30000 | S-FPL53 | 26.14 |
| 18 | | −37.5554 | 0.30000 | | 27.02 |
| 19 | | 232.2161 | 6.00000 | S-FPL51 | 27.98 |
| 20 | | −33.3737 | 0.30000 | | 28.36 |
| 21 | | −77.5706 | 3.00000 | ACRYLIC | 27.83 |
| 22 | a | −49.5844 | 6.92542 | | 27.74 |
| 23 | | ∞ | 4.95500 | BK7 | 25.91 |
| 24 | | ∞ | 1.44000 | POLYCARB | 25.23 |
| 25 | | ∞ | 49.00000 | SF2 | 25.04 |
| 26 | | ∞ | 4.00000 | | 18.83 |
| 27 | | ∞ | 2.50000 | BK7 | 17.99 |
| 28 | | ∞ | 0.21000 | POLYCARB | 17.65 |
| 29 | | ∞ | −0.00030 | | 17.63 |

Symbol Description
a - Polynomial asphere
c - Conic section
Focal Shift    −0.06051

Even Polynomial Aspheres

| Surf. No. | D | E | F | G | H | I |
| --- | --- | --- | --- | --- | --- | --- |
| 1 | 5.5140E−05 | −1.2755E−07 | 8.2598E−11 | 4.0143E−13 | −5.8089E−16 | 8.9842E−21 |
| 2 | 5.8955E−05 | 4.1395E−08 | −1.0013E−09 | −3.6784E−13 | 2.4401E−14 | −5.6812E−17 |
| 22 | 7.1508E−06 | 6.6037E−10 | 1.2160E−11 | −9.3582E−14 | 5.6757E−16 | −1.1372E−18 |

Conic Constant
Surface 2    k = −1.0000E+00

First Order Data

| f/number | 2.80 | Overall Length | 964.996 |
| --- | --- | --- | --- |
| Magnification | −0.0133 | Stop Diameter | 9.576 |
| Object Height | −660.40 | Barrel Length | 150.571 |
| Object Distance | −814.425 | Entrance Pupil Distance | 21.6797 |
| Effective Focal Length | 11.1559 | Exit Pupil Distance | −8331.62 |
| Image Distance | −.298217E−03 | | |
| Stop Surface Number | 9 | | |

TABLE 4

| Surf. No. | Type | Radius | Thickness | Glass | Clear Aperture Diameter |
| --- | --- | --- | --- | --- | --- |
| 1 | a | 106.6356 | 3.00000 | ACRYLIC | 38.25 |
| 2 | a | 21.6115 | 6.97733 | | 29.79 |
| 3 | | 25.3000 | 2.50000 | S-LAL8 | 26.20 |
| 4 | | 16.2000 | 4.80000 | | 22.36 |

TABLE 4-continued

| | | | | | |
|---|---|---|---|---|---|
| 5 | | 70.2300 | 1.80000 | S-LAL18 | 21.53 |
| 6 | | 14.3400 | 6.60000 | S-FTM16 | 19.05 |
| 7 | | −99.2700 | 1.21050 | | 17.89 |
| 8 | | −50.0950 | 1.50000 | S-LAL18 | 17.11 |
| 9 | | 14.2500 | 4.50000 | S-TIH6 | 15.66 |
| 10 | | 106.6500 | 13.71753 | | 14.80 |
| 11 | | Aperture stop | 7.29626 | | 9.54 |
| 12 | | −90.7800 | 5.50000 | S-FPL53 | 13.40 |
| 13 | | −10.4970 | 1.40000 | S-LAH55 | 14.77 |
| 14 | | −72.7500 | 0.80000 | | 17.81 |
| 15 | | −4584.0000 | 5.00000 | S-FPL53 | 19.61 |
| 16 | | −26.1800 | 0.20000 | | 21.84 |
| 17 | | 811.4001 | 7.50000 | S-FPL53 | 24.19 |
| 18 | | −21.8000 | 0.50000 | | 25.97 |
| 19 | a | 89.6854 | 7.00000 | ACRYLIC | 27.29 |
| 20 | a | −31.5584 | 4.86429 | | 27.61 |
| 21 | | ∞ | 1.00000 | BK7 | 26.00 |
| 22 | | ∞ | 2.00000 | | 25.86 |
| 23 | | ∞ | 2.20000 | BK7 | 25.43 |
| 24 | | ∞ | 1.10000 | POLYCARB | 25.12 |
| 25 | | ∞ | 51.00000 | SF2 | 24.98 |
| 26 | | ∞ | 2.00000 | | 18.42 |
| 27 | | ∞ | 2.40000 | BK7 | 17.99 |
| 28 | | ∞ | 0.07000 | POLYCARB | 17.67 |
| 29 | | ∞ | −0.00113 | | 17.68 |

Symbol Description
a - Polynomial asphere
Focal Shift  −0.05535

Even Polynomial Aspheres

| Surf. No. | D | E | F | G | H | I |
|---|---|---|---|---|---|---|
| 1 | 3.6196E−05 | −3.7509E−08 | −3.1361E−11 | 9.8606E−14 | 7.6981E−17 | −1.4682E−19 |
| 2 | 2.7865E−05 | 4.6602E−08 | −3.3073E−11 | −9.6310E−13 | −2.0067E−15 | 1.5700E−17 |
| 19 | −2.9659E−07 | −5.5950E−09 | 1.7257E−11 | 3.8895E−14 | −4.1354E−16 | −2.5237E−18 |
| 20 | 1.3871E−05 | −5.7560E−09 | 1.3262E−10 | −1.0498E−12 | 4.5835E−15 | −1.0785E−17 |

First Order Data

| | | | |
|---|---|---|---|
| f/number | 2.80 | Overall Length | 964.999 |
| Magnification | −0.0135 | Stop Diameter | 9.277 |
| Object Height | −654.00 | Barrel Length | 148.436 |
| Object Distance | −816.565 | Entrance Pupil Distance | 21.6766 |
| Effective Focal Length | −11.3160 | Exit Pupil Distance | −6338.20 |
| Image Distance | −.113196E−02 | | |
| Stop Surface Number | 11 | | |

TABLE 5

| Example | f0 | f1 | f2 | f3 |
|---|---|---|---|---|
| 1A | 12.24 | −30.47 | 34.64 | −162.00 |
| 1B | 12.28 | −30.53 | 34.64 | −162.00 |
| 2 | 12.15 | −29.67 | 35.12 | −102.41 |
| 3 | 11.16 | −15.09 | 26.45 | — |
| 4 | 11.32 | −19.88 | 25.76 | — |

TABLE 6

| Example | f0 | BFL | BFL/f0 | FVD | FVD/f0 | D[1] | D/f0 | θ |
|---|---|---|---|---|---|---|---|---|
| 1A | 12.24 | 60.87 | 4.97 | 181.95 | 14.87 | 55.00 | 4.49 | 78.8° |
| 1B | 12.28 | 60.89 | 4.96 | 181.61 | 14.79 | 55.00 | 4.48 | 78.3° |
| 2 | 12.15 | 60.92 | 5.01 | 184.64 | 15.20 | 56.58 | 4.66 | 78.8° |
| 3 | 11.16 | 46.44 | 4.16 | 127.98 | 11.47 | 38.06 | 3.41 | 76.3° |
| 4 | 11.32 | 44.06 | 3.89 | 125.86 | 11.12 | 38.25 | 3.38 | 75.7° |

[1]Maximum clear aperture.

What is claimed is:

1. A projection lens for forming an image of a pixelized panel said projection lens having a long conjugate side and a short conjugate side and comprising in order from said long conjugate side to said short conjugate side of:

(A) a first lens unit having a negative power and comprising at least one negative lens element of overall meniscus shape, said negative lens element being convex towards the long conjugate side and comprising at least one aspheric surface; and (B) a second lens unit having a positive power, said second lens unit being separated from the first lens unit by an axial space and comprising at least one positive lens element which comprises at least one aspheric surface;

wherein:
(i) the projection lens is telecentric on the short conjugate side;
(ii) the projection lens has an effective focal length $f_0$, an effective back focal length BFL, and a forward vertex distance FVD which satisfy the following relationships:

$BFL/f_0 > 3.5$; and $FVD/f_0 < 17$; and (iii) the projection lens has a field of view θ in the direction of the long conjugate side of the lens which satisfies the relationship:

$\theta > 70°$.

2. The projection lens of claim 1 wherein:

$BFL/f_0 > 4.0$.

3. The projection lens of claim 1 wherein:

(i) the projection lens comprises a plurality of lens elements each of which has a clear aperture;
(ii) the maximum clear aperture diameter is D; and
(iii) D satisfies the relationship:

$D/f_0 < 5.0$.

4. The projection lens of claim 3 wherein:

$D/f_0 < 4.0$.

5. The projection lens of claim 1 wherein:

$75° \leq \theta \leq 80°$.

6. The projection lens of claim 1 wherein each of the first and second lens units comprises a color correcting doublet.

7. The projection lens of claim 1 wherein the projection lens comprises an aperture stop located in the axial space between the first lens unit and the second lens unit.

8. The projection lens of claim 7 wherein the projection lens comprises a third lens unit located in the vicinity of the aperture stop.

9. The projection lens of claim 8 wherein the third lens unit comprises at least one color correcting doublet.

10. A projection lens system comprising:

(a) a pixelized panel; and
(b) the projection lens of claim 1.

11. The projection lens systems of claim 10 further comprising an illumination system which comprises a light source and illumination optics which forms an image of the light source.

* * * * *